US012769323B2

(12) United States Patent
Goehlich

(10) Patent No.: US 12,769,323 B2
(45) Date of Patent: Oct. 20, 2026

(54) NAVIGATION SYSTEM FOR NAVIGATING AN AUTONOMOUS MOBILE ROBOT WITHIN A PRODUCTION ENVIRONMENT

(71) Applicant: Airbus Operations GmbH, Hamburg (DE)

(72) Inventor: Robert Alexander Goehlich, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 6 days.

(21) Appl. No.: 19/169,196

(22) Filed: Apr. 3, 2025

(65) Prior Publication Data

US 2025/0321582 A1 Oct. 16, 2025

(30) Foreign Application Priority Data

Apr. 11, 2024 (EP) .................................... 24169677

(51) Int. Cl.
*G05D 1/244* (2024.01)
*G05D 1/246* (2024.01)
(Continued)

(52) U.S. Cl.
CPC ........... *G05D 1/2446* (2024.01); *G05D 1/246* (2024.01); *G05D 1/644* (2024.01);
(Continued)

(58) Field of Classification Search
CPC ...... G05D 1/244; G05D 1/2446; G05D 1/246; G05D 1/644; G05D 2101/10; G05D 2109/10; G05D 2111/17
(Continued)

(56) References Cited

U.S. PATENT DOCUMENTS 10,353,395 B2 * 7/2019 Hance .................. G05D 1/0236
12,333,943 B2 * 6/2025 Ustach .................. G06Q 10/08
(Continued)

FOREIGN PATENT DOCUMENTS

EP 4318165 A1 2/2024
WO 2006065563 A2 6/2006

OTHER PUBLICATIONS

European Search Report for corresponding European Patent Application No. 24169677.2 dated Aug. 2, 2024.
(Continued)

*Primary Examiner* — Andrew Joseph Rudy
(74) *Attorney, Agent, or Firm* — Greer, Burns & Crain, Ltd.

(57) ABSTRACT

A navigation system for navigating an autonomous mobile robot in an environment is provided. The navigation system includes at least one optical sensor attached to the autonomous mobile robot, a controller in communication with the at least one optical sensor, and a plurality of optical identifiers distributed within the environment at fixed locations and detectable by the at least one optical sensor. Each of the plurality of optical identifiers encodes a location within the environment. The controller is configured to obtain pictures of the environment via the at least one optical sensor, detect visible optical identifiers of the plurality of optical identifiers, which are within a field of view of the at least one optical sensor, decode the visible optical identifiers, and navigate the autonomous mobile robot based on real-time localizations of the autonomous mobile robot within the environment using the decoded visible optical identifiers.

12 Claims, 4 Drawing Sheets

(51) Int. Cl.
*G05D 1/644* (2024.01)
*G05D 101/10* (2024.01)
*G05D 109/10* (2024.01)
*G05D 111/10* (2024.01)

(52) U.S. Cl.
CPC ..... *G05D 2101/10* (2024.01); *G05D 2109/10* (2024.01); *G05D 2111/17* (2024.01)

(58) Field of Classification Search
USPC ............................................................ 701/28
See application file for complete search history.

(56) References Cited

U.S. PATENT DOCUMENTS

| | | | |
|---|---|---|---|
| 2011/0121068 A1 | 5/2011 | Emanuel et al. | |
| 2018/0088586 A1 | 3/2018 | Hance et al. | |
| 2024/0036175 A1* | 2/2024 | Wang | G01S 7/4802 |

OTHER PUBLICATIONS

A. Babinec et al., "Visual Localization of Mobile Robot Using Artificial Markers" Procedia Engineering, vol. 96, Jan. 30, 2014.

* cited by examiner

NAVIGATION SYSTEM FOR NAVIGATING AN AUTONOMOUS MOBILE ROBOT WITHIN A PRODUCTION ENVIRONMENT

CROSS-REFERENCES TO RELATED APPLICATIONS

This application claims the benefit of European Patent Application Number 24169677.2 filed on Apr. 11, 2024, the entire disclosure of which is incorporated herein by way of reference.

FIELD OF THE INVENTION

The present disclosure relates to a navigation system for navigating an autonomous mobile robot within an environment, to an autonomous mobile robot implementing such a navigation system, and to a corresponding method for navigation.

BACKGROUND OF THE INVENTION

In environments such as production environments or maintenance environments, in particular for aircraft and spacecraft, a fuselage of the aircraft and spacecraft oftentimes is inspected using optical scanners. Such inspections are performed in order to detect undesirable anomalies such as dents, rivet pull-ins, out-of-contour deformations, blend-outs, and scratches. For this, the optical scanners may be arranged within a handheld unit and an operator of the unit may scan the surface of the fuselage with the handheld unit in a grid or matrix like pattern. In order to accurately locate detected anomalies on the surface of the fuselage, the operator can mark the surface at each taken scan manually, e.g., by attaching a corresponding mark on the surface indicating the position, which is then, for example, also photographed by the optical scanner and therefore enables matching of the scans to surface areas. In order to reduce workload, overlaps of individual scans have to be reduced as far as possible.

Further, autonomous mobile robots are known, which in principle are able to automatically take scans of the surface of the fuselage and to automatically move within an environment. Such autonomous mobile robots may, for example, comprise a robot at which different end effectors (such as the mentioned optical scanners) may be attached. In particular, because of the large dimensions of, for example, an aircraft fuselage, the autonomous mobile robot needs to somehow navigate within the environment (e.g., within an assembly hangar). Usually, this is done by utilizing distance scanners (such as LiDAR scanners).

However, such navigation only allows for very limited navigational ranges and particular automatic navigation of the autonomous mobile robot between different regions, such as between buildings of a production plant, may be problematic.

SUMMARY OF THE INVENTION

Accordingly, it is an objective to provide a navigation/localization system, e.g., for navigating an autonomous mobile robot within an environment or for determining work positions on an object, which is reliable and safe and enables automatic navigation/localization within large environments.

In the present disclosure, a navigation system for an autonomous mobile robot (first aspect), a handheld device for performing a work task (second aspect), an autonomous mobile robot implementing the disclosed navigation system (third aspect), as well as a method for navigating an autonomous mobile robot (fourth aspect) is disclosed. It should be appreciated that features and embodiments described with regard to any one of these aspects are also fully valid with regard to the remaining aspects and vice versa. Most features and embodiments will be described with regard to the navigation system. However, these features and embodiments may also be implemented with the autonomous mobile robot, the handheld device, and the method. Any and all of the disclosed features, feature combinations and embodiments are explicitly disclosed for all aspects of the present disclosure.

According to a first aspect, a navigation system for navigating an autonomous mobile robot in an environment is provided. The navigation system comprises at least one optical sensor attached to the autonomous mobile robot, a controller in communication with the at least one optical sensor, and a plurality of optical identifiers distributed within the environment at fixed locations and detectable by the at least one optical sensor. Each of the plurality of optical identifiers encodes a location within the environment. The controller is configured to obtain pictures of the environment via the at least one optical sensor, detect visible optical identifiers of the plurality of optical identifiers, which are within a field of view of the at least one optical sensor, decode the visible optical identifiers, and navigate the autonomous mobile robot based on real-time localizations of the autonomous mobile robot within the environment using the decoded visible optical identifiers.

An autonomous mobile robot may be used to autonomously carry out certain operations within an environment. It should be appreciated that, although herein mainly described with regard to aircraft applications, the autonomous mobile robot may be used in any other conceivable application and also may not only be an inspection robot but may, for example, also carry out certain manufacturing processes, such as riveting, etc. The novel aspects of this application do not concern the specific application of an autonomous mobile robot but rather the navigation of such a robot, independent of the purpose the robot is used for.

For example, in manufacturing of aircraft, spacecraft (but also for any other conceivable vehicles or objects), operations, such as surface inspection for anomalies, riveting operations, or other operations are carried out, which may need to be processed on large surfaces or in large environments in general. Such operations currently are mainly carried out manually by inspection or manufacturing personnel using hand-held devices. Further, for example in inspection applications, usually large parts of the surface (e.g., of a fuselage of an aircraft), are, for example, scanned in a grid like pattern with optical scanners such as matrix cameras in order to detect anomalies such as dents, rivet pull-ins, out-of-contour deformations, blend-outs, and scratches. Detected anomalies have to be correlated with their location on the scanned surface. For this, usually an operator marks each section before scanning, e.g., by attaching corresponding stickers or other marks to the surface, such that these marks are recorded together with the scan for correlation with the detected anomalies. All of the aforementioned leads to a high workload and high time requirements.

These drawbacks can be avoided by using an autonomous mobile robot which carries out the corresponding operations fully automatically. However, in order to avoid manual intervention, the autonomous mobile robot needs to be able to navigate within the environment in a safe and reliable manner.

The autonomous mobile robot may, for example, comprise a drive unit (for example comprising a motor unit (e.g., electric motor powered by a battery)) and propulsion means in contact with a ground onto which the autonomous mobile robot is placed. The propulsion means may, for example, comprise wheels (some of which may be steerable), a track drive, or any other steerable propulsion means.

The environment, in which the autonomous mobile robot navigates, may, for example, be a production environment (such as an assembly hangar for an aircraft or spacecraft), a maintenance environment/hanger, a logistics environment, or in general any other environment, in which navigation of an autonomous mobile robot is desirable. In particular, the environment may be an indoor environment, an outdoor environment, or both and may comprise multiple regions. In particular, the navigation system also provides for navigation between an indoor and an outdoor environment or in general within a certain region as well as between such regions.

The navigation system and the corresponding method are based on optical navigation using a plurality of optical identifiers which are distributed within the environment. The optical identifiers are arranged at fixed locations within the environment and, in particular, each of the optical identifiers encodes the corresponding location of the corresponding optical identifier within the environment. In a preferred embodiment, the optical identifiers are QR codes, wherein the data content of each of the QR codes (or the optical identifier in general, independent on the type of optical identifier) corresponds to the location of the corresponding QR code within the environment. However, the optical identifiers may also be any other suitable identifier, as is described further below. The data content of the optical identifiers may, for example, be in the form of coordinates with regard to a map of the environment which is stored within or accessible by the controller.

For example, in an assembly hangar for aircraft, optical identifiers may be arranged at walls, on fixed structures within the hangar, such as beams, support structures for an aircraft fuselage, or at any other fixed location within the environment. Further, optical identifiers may even be provided on the object, at which the autonomous mobile robot performs some action (such as inspection scanning) itself, as usually the object (such as an aircraft fuselage), when being processed, is located at a distinct location within the environment.

The optical identifiers may be printed, painted, light projected onto the corresponding location, or provided in any other suitable way. Preferably, the optical identifiers may not be provided on the floor (in particular, when the optical identifiers are printed/painted or similar), as such optical identifiers may become undetectable over time because of deterioration. However, in principle, providing optical identifiers on the floor is also possible. Also, if the optical identifiers are light projected, nothing prevents them from being projected onto the floor.

The navigation system further comprises a controller and at least one optical sensor, such as a high-resolution camera, which is directly attached to the autonomous mobile robot, and which is capable of capturing the optical identifiers. The controller may be arranged directly at the autonomous mobile robot but may also be a remote controller in communication with the autonomous mobile robot. For example, the autonomous mobile robot may be equipped with a forward-facing camera having a certain field of view. Further, the autonomous mobile robot may have multiple such optical sensors facing in different directions of the autonomous mobile robot. When the autonomous mobile robot moves through the environment, depending on the current location within the environment, some of the plurality of optical identifiers at some point come into corresponding fields of view of the at least one optical sensor.

In particular when the autonomous mobile robot moves, the controller uses the at least one optical sensor, to continuously capture pictures of the environment (e.g., as discrete pictures taken in periodic time intervals or in a video stream). Each time when corresponding ones of the plurality of optical identifiers come into the field of view of at least one optical sensor, the controller is configured to detect/recognize the corresponding optical identifiers within the field of view (i.e., the visible optical identifiers).

The controller further is configured to then decode the optical identifiers (i.e., to decode their data content) which are visible at the current instance in time (visible optical identifiers) and therefore to obtain the locations of the corresponding currently visible optical identifiers within the environment. Since the orientations of each of the at least one optical sensors on the autonomous mobile robot are known by the controller, the controller can determine an orientation and viewing direction of the autonomous mobile robot as a whole with regard to each visible optical identifier, i.e., angular locations of the visible optical identifiers with regard to the autonomous mobile robot. The decoded and therefore known locations of the visible optical identifiers and the viewing direction of the autonomous mobile robot with regard to each of the visible optical identifiers can then be used to determine a current localization (i.e., coordinates) of the autonomous mobile robot within the environment. This determination may in general be done in any suitable way (for example, triangulation, trilateration, triangulateration, etc.).

Further, based on the current viewing directions of the autonomous mobile robot with regard to each of the visible optical identifiers, an overall orientation of the autonomous mobile robot within the environment and therefore a current movement direction, i.e., a direction into which the autonomous mobile robot would travel if it were not steered, can be determined. The controller can then use the real-time localizations and the orientation to navigate the autonomous mobile robot within the environment (the term "real-time localization" refers to the continuous determination of the current location of the autonomous mobile robot). The controller may have a map of the environment stored within a data storage from which the current location and the orientation of the autonomous mobile robot within the environment may be determined by using the known (decoded) positions of the visible optical identifiers and the determined viewing directions of the autonomous mobile robot with regard to each visible optical identifier.

According to an embodiment, the controller is configured to estimate a distance to each of the visible optical identifiers and to navigate the autonomous mobile robot by applying a triangulation method between each pair of the visible optical identifiers.

In regular triangulation, the position of an object is determined by observing it with two sensors whose positions and their distance to each other are known. Therefore, each of the two sensors builds an observation line with the object (the imaginary line connecting the corresponding sensor with the object). By observing the object from the two sensors, for each sensor an observation angle between the corresponding observation line and the connecting line of the two sensors can be directly measured. The connecting line between the two sensors and the two observation lines then build a triangle. Based on the known positions of the two sensors (and their distance) and the observation angles, the position of the object can be determined by determining the intersection point of the observation lines.

However, deviating from this general approach of triangulation, in the disclosed navigation system, the object to be located (the autonomous mobile robot, or rather the controller) determines its own location. Therefore, a modified triangulation approach is used, which further takes into account distances to the optical identifiers. The two sensors described above for the regular triangulation method are represented by the at least one optical sensor that is arranged on the autonomous mobile robot. Instead of using the connecting line between the two sensors, the connection line between two of the visible optical identifiers (whose locations within the environment are known, as described above) is used. The observation lines described above then correspond to the lines connecting the autonomous mobile robot with each of these two visible optical identifiers. However, the observation angles (corresponding angle between the known connecting line of two optical identifiers and the observation line between the autonomous mobile robot and the corresponding optical identifier) cannot be measured directly by the autonomous mobile robot only by using the viewing directions to the visible optical identifiers. This is because the location of the autonomous mobile robot, of course, is not yet known.

Therefore, further a distance to each of the visible optical identifiers is determined. For this, for example, each of the optical identifiers may have the same size and the distance can be determined based on the apparent size observed by the corresponding optical sensor. The further away an optical identifier is, the smaller the apparent size observed by the optical sensor. The distance may then, for example, be estimated based on a corresponding calibration of the optical sensors (for example based on a look up table or a machine learning model). Alternatively or additionally, the distance to each of the visible optical identifiers may, for example, be determined by using time of light measurements (e.g., LiDAR sensors attached to the autonomous mobile robot) or by using any other suitable distance measurement method.

Using the estimated distances to the optical identifiers of each pair of the visible optical identifiers and the determined viewing directions (for example expressed as an angle with regard to a forward direction of the autonomous mobile robot) with regard to each of these optical identifiers, the controller can determine the observation angles with regard to each pair of visible optical identifiers and can then, just as in regular triangulation, determine the location of the autonomous mobile robot based on the observation angles by determining the intersection point of the observation lines for each pair of visible optical identifiers.

Using each pair of visible optical identifiers for determining the localizations of the autonomous mobile robot provides for redundancy and plausibility control. If the individual localizations deviate by a critical magnitude from each other, the localization using the optical identifiers may for example be deemed to be dysfunctional and the autonomous mobile robot may be stopped. Further, if the localizations by using different pairs of visible optical identifiers deviate by a non-critical magnitude from each other, the localization may be determined as an average of the individual localizations.

According to a further embodiment, the controller is configured to assign a weight to each of the visible optical identifiers based on the distance. Optical identifiers closer to the autonomous mobile robot are assigned a higher weight for navigating the autonomous mobile robot.

The distance estimation for an optical identifier (or in general of any object) based on an optical scan of the optical identifier (such as a picture of the optical identifier that is recorded with an optical sensor such as a camera) is more accurate for optical identifiers closer to the optical sensor. This results, for example, from the fact that alignment inaccuracies (e.g., angle inaccuracies) of a camera have a stronger effect on the measurement for larger distances because a small deviation in the angle leads to a larger deviation in the estimated position of the corresponding optical identifier, hence leading to a larger offset in the localization of the autonomous mobile robot determined by using optical identifiers that are far away (because the localization of the autonomous mobile robot is determined relative to the optical identifiers). Therefore, visible optical identifiers closer to the autonomous mobile robot are assigned a higher weight for determining the real-time localizations. In particular, when determining the real-time localizations of the autonomous mobile robot, the controller may for example build a weighted average of the individual localizations determined based on each pair of the optical identifiers, such that optical identifiers closer to the autonomous mobile robot have a greater impact on the determined real-time localizations and therefore on the navigation of the autonomous mobile robot. In particular, when each of the optical identifiers has the same actual size (not recorded size), the controller may recognize which of the optical identifiers are closer to the autonomous mobile robot and assign those optical identifiers that appear bigger in the optical scans (e.g., recorded pictures) a higher weight. This increases the overall accuracy of the navigation. Further, individual optical identifiers (not only pairs of optical identifiers) may be assigned individual weights that are used in the triangulation for each pair of optical identifiers.

According to a further embodiment, the at least one optical sensor comprises at least one of a high-resolution camera and a near-distance low-resolution camera.

Near-distance low-resolution camera(s) attached to the autonomous mobile robot may be exclusively used for the navigation system. High-resolution cameras may also be exclusively used for the navigation, but may, for example, also be cameras that are used by the autonomous mobile robot in performing some task, for example for optical inspection scans of the surface of an aircraft fuselage. High-resolution cameras are, in particular, useful for detecting optical identifiers that are farther away from the autonomous mobile robot. By additionally using high-resolution cameras that are present on the autonomous mobile robot anyway (because the autonomous mobile robot uses these camera(s), for example, for performing work tasks such as surface scans), the overall navigation accuracy can be increased because the overall field of view can be increased and therefore more optical identifiers may be visible.

However, it should be appreciated that each of the at least one optical scanners may be any suitable camera or other optical scanner that is capable of detecting the optical identifiers.

According to a further embodiment, each of the optical identifiers is a printed or light projected optical identifier and comprises at least one of the following: a QR code, a barcode, a JAB code, an Aztec code, and a reference number.

In particular, these optical identifiers may have a substantial dimension, such that they can be easily detected by the optical sensors when distributed within the environment. Each of these optical identifiers can be detected by a camera as an optical sensor and can be decoded by the controller.

QR codes (Quick-Response codes), JAB codes (Just Another Barcode), and Aztec codes are two-dimensional matrix codes that can store information, while a barcode is a one-dimensional code for storing information. A JAB code is similar to a QR code but is a color 2D matrix symbology made of color squares arranged in either square or rectangle grids. It contains one primary symbol and optionally multiple secondary symbols and can store even more information than, for example, a regular QR code. In general, any of such optical identifiers or any other suitable optical identifier can be used for the disclosed navigation system. In particular, these optical identifiers can be designed to carry as data content a location within the environment at which the corresponding optical identifier is arranged. Alternatively, the optical identifiers may also just carry, for example, a number of the corresponding optical identifier which is then correlated with the location within the map of the environment, which is accessible by the controller. Preferably, the optical identifiers are QR codes.

According to a further embodiment, the plurality of optical identifiers comprises a first subset of optical identifiers and a second subset of optical identifiers. The first subset is associated with a first region of the environment. The second subset is associated with a second region of the environment.

For example, in aircraft applications, where the whole fuselage is inspected by the autonomous mobile robot (but also in other applications), it may be necessary that the autonomous mobile robot works on different levels, i.e., vertically separated floors. Such floors may, for example, be connected by elevators. Each of such levels may be a corresponding mapped region within the environment, such that two-dimensional localization of the autonomous mobile robot is possible by switching between corresponding maps. The corresponding maps then only cover the corresponding region of the environment. Further, it may be necessary for the autonomous mobile robot to travel between different buildings, such as between separate assembly hangars. The different buildings then correspond to regions of the overall environment. Travelling between such buildings may also include travelling between indoor and outdoor regions.

Therefore, the plurality of optical identifiers may be separated in individual subsets, wherein each subset is associated with a corresponding region and therefore a corresponding map. This allows for the controller to automatically switch to the corresponding map when an optical identifier of another region (i.e., a region outside the current region as given by the last localization) is detected. Further, at certain transition points, such as at an elevator entrance or an assembly hangar door, dedicated optical identifiers may be arranged which specifically instruct the controller to switch to a corresponding map after the transition point. For example, the elevator itself, when coming from a first floor, may be included in the map of each floor. When the autonomous mobile robot enters the elevator and travels to another floor, it may either detect a corresponding optical identifier that instructs the controller to switch to the map of the next floor or it may simply do so, as soon as a first optical identifier of another floor is detected. This allows for covering large environments, that may even be vertically separated into different regions, while still only using two-dimensional navigation.

According to a further embodiment, the localizations using the decoded visible optical identifiers are determined by referencing a map of the environment stored in a data storage based on the visible optical identifiers.

Such a map may include the locations of all optical identifiers within the environment (or only those in certain region of the environment in certain embodiments). Hence, the optical identifiers each encode their corresponding location within the map, such that the autonomous mobile robot can navigate within the map and therefore within the environment. The map may optionally also include travel paths between target points within the environment.

According to a further embodiment, the navigation system further comprises at least one LiDAR scanner arranged at the autonomous mobile robot and in communication with the controller. The at least one LiDAR scanner is configured to scan the surroundings of the autonomous mobile robot. The controller is configured to additionally localize the autonomous mobile robot within the environment based on the scan of the at least one LiDAR scanner. The controller is configured to compare the localization of the at least one LiDAR scanner with the localization of the at least one optical sensor and to obtain a corresponding variance.

The at least one LiDAR scanner serves as a redundancy, in particular for ensuring security. For example, the navigation system may continuously scan distances between the sides of the autonomous mobile robot and corresponding walls or other objects using the LiDAR scanners. If these distances are inconsistent with the localizations obtained by means of the optical sensors (herein optical navigation in the following), a corresponding mismatch or variance (i.e., a location difference between the localization methods) is determined. If, for example, the navigation system by using the optical scanners determines a certain location and orientation within an assembly hangar, the corresponding map includes the walls of the assembly hangar. Therefore, the controller can determine (from the map and the determined localization and orientation), how far away the next wall at each side of the autonomous mobile robot should be. If the LiDAR scanners deviate from these distances, the controller determines a mismatch between the methods and therefore can recognize a faulty or inaccurate navigation.

According to a further embodiment, the controller is configured to navigate the autonomous mobile robot purely based on the optical identifiers when the variance is below a first threshold, and to stop the autonomous mobile robot when the variance is higher than a second threshold.

Small deviations between the optical navigation and the LiDAR navigation may be unproblematic. Therefore, if the variance between the optical navigation and the LiDAR navigation is above a predefined first threshold value but below a second threshold value (intermediate variance range), the autonomous mobile robot may continue to rely solely on the optical navigation. If the first threshold is exceeded, the navigation system may still use the optical navigation but may increase involvement of other navigation methods such as the LiDAR scanner, for example by correcting the path of the autonomous mobile robot based on the determined variance.

However, if a critical variance (second threshold) is exceeded, the controller may stop the autonomous mobile robot for ensuring security, until the issue is solved by a human operator or until the navigation system is reset by such an operator. The second threshold may be higher than the first threshold or may be the same as the first threshold. In the latter case, there is no intermediate variance range, and the navigation system immediately goes into emergency stop if the variance exceeds the first threshold.

According to a further embodiment, the controller is configured to store a navigation history of the autonomous mobile robot. The navigation history is used as training data for an artificial intelligence module (AI module).

Such an AI module generally may also be referred to as a machine learning module. The navigation history may, for example, include the paths the autonomous mobile robot travelled in the past as well, for example, any incidents or problems encountered on these paths. For example, such incidents or problems may include inaccuracies as determined by additional navigation methods (for example by LiDAR scanners, as described above with regard to an embodiment), emergency stops, collisions with fixed items, and similar incidents on the path as well as the location where these incidents occurred. By using these data as training data, the AI module may learn to avoid such incidents in the future. For example, if repeatedly at a specific location a determined inaccuracy of the localization of the autonomous mobile robot always has the same magnitude, the AI module may automatically correct the localization at this position in the future based on the training data. Any other AI algorithm for improving the optical navigation is conceivable.

According to a further embodiment, the AI module is used for optimizing paths of the autonomous mobile robot and/or for identifying anomalies within the environment.

For example, if different paths are available between two points of interest within the environment, the AI module may determine the fastest path without any incidents or problems based on the training data (past travels) or may avoid paths, where in the past problems occurred.

According to a further embodiment, each of the plurality of optical identifiers is arranged at one of the following: a wall within the environment, a supporting structure for a product to be processed by the autonomous mobile robot, a product to be processed by the autonomous mobile robot, a second autonomous mobile robot or another robot system in communication with the controller, a drone, a handheld device, or a human operator.

If some of the optical identifiers are arranged on movable objects such as drones or other robots, these drones or robots may communicate with the autonomous mobile robot (or rather with the controller, which may also be a central controller for all devices operating within the environment) and may, in particular, transmit their current positions via a data channel such as a WiFi connection or any other communication connection to the controller. In this way, the controller can correlate the corresponding optical identifiers with their current position and can use these optical identifiers in the same way as the optical identifiers that are fixed in location, as described above. Further, other robots and drones may also receive the current position of the autonomous mobile robot and may navigate in the same way. The autonomous mobile robot itself may also carry at least one optical identifier. Hence, a network of cooperatively navigating devices such as autonomous mobile robots is established, that support each other while navigating within the environment.

According to a second aspect, a handheld device for performing a work task on an object by a human operator is disclosed. The handheld device comprises at least one work tool, a camera, and a controller. The controller is configured to obtain pictures of an environment within which the handheld device is operated via the camera and to detect visible optical identifiers of a plurality of optical identifiers that are arranged at fixed locations within the environment. The visible optical identifiers are optical identifiers which are within a field of view of the at least one optical sensor. The controller is further configured to decode the visible optical identifiers, and to correlate data pertaining to the work task with work positions at the object at which the work task has been performed based on real-time localizations of the handheld device within the environment using the decoded visible optical identifiers.

The handheld device may, for example, be an inspection device, a riveting device, or any other handheld device for performing a work task on an object such as a fuselage. For example, if the handheld device is an inspection device, the work tool may be an optical scanner for obtaining optical scans of a surface of the object (e.g., fuselage). Oftentimes, it is necessary to save position, for example, on the fuselage, at which a corresponding scan (or in general work task) has been performed (for example a position of a stringer or a frame (or both) of the fuselage, at which the scan has been taken). In order to avoid manually entering or marking the position on the object, the handheld device uses the same principle as the navigation system described above, to obtain its current location. Therefore, the corresponding discussion for how the real-time localizations are obtained by detecting visible optical identifiers within the environment will not be repeated here.

However, instead of for navigation purposes, the real-time localizations may be obtained, for example, each time a scan (or some other work task) is performed. The determined localization at each work task (i.e., the position, at which the handheld device is located within the environment) are used to determine a position on the object (e.g., a position on a fuselage), at which the work task has been performed. These positions may then be correlated with data pertaining to the work task (e.g., with optical scans taken at that position).

The camera of the handheld device, that is used for obtaining pictures of the environment may either be an integrated camera of the handheld device, or may be a camera, that can be attached to the handheld device and that communicates with the controller and can be used by the controller for obtaining the pictures of the optical identifiers within the environment. For example, the camera may be a camera of a smartphone, that is attached to the handheld device at a corresponding adapter. The smartphone may then be connected to the controller and may be used for obtaining the corresponding pictures.

According to a third aspect, an autonomous mobile robot is provided. The autonomous mobile robot comprises at least one optical sensor, and a controller. The controller is configured to obtain pictures of an environment in which the autonomous mobile robot is located via the at least one optical sensor, to detect visible optical identifiers. The visible optical identifiers are located within a field of view of the at least one optical sensors. The visible optical identifiers belong to a plurality of optical identifiers located within the environment at fixed locations. Each of the plurality of optical identifiers encodes a location within the environment. The controller is further configured to decode the visible optical identifiers, and to navigate the autonomous mobile robot based on real-time localizations of the autonomous mobile robot within the environment using the decoded visible optical identifiers.

The autonomous mobile robot may, for example, be an inspection robot or any other robot. The autonomous mobile robot has already been described above with regard to the navigation system itself. Therefore, the corresponding discussion will not be repeated here. Rather, for further details, reference is made to the above discussion of the navigation system and its embodiments, which is fully valid for the autonomous mobile robot.

According to a fourth aspect, a method for navigating an autonomous mobile robot within an environment is provided. The method comprises obtaining, by a controller, pictures of the environment via at least one optical sensor attached to the autonomous mobile robot, and detecting, by the controller, visible optical identifiers of a plurality of optical identifiers. The visible optical identifiers are in a field of view of the at least one optical sensor. Each of the plurality of optical identifiers encodes a fixed location within the environment. The method further comprises decoding, by the controller, the visible optical identifiers, and navigating, by the controller, the autonomous mobile robot based on real-time localizations of the autonomous mobile robot within the environment using the decoded visible optical identifiers.

The method for navigating the autonomous mobile robot concurrently has been described with regard to the navigation system. Therefore, the discussion with regard to the navigation system and its embodiments is fully valid for the method and will not be repeated here. Rather, it is referred to the discussion of the navigation system.

BRIEF DESCRIPTION OF THE DRAWINGS

In the following, exemplary embodiments are described in more detail having regard to the attached figures. The illustrations are schematic and not to scale. Identical reference signs refer to identical or similar elements.

DETAILED DESCRIPTION OF THE PREFERRED EMBODIMENTS

Figure 1:
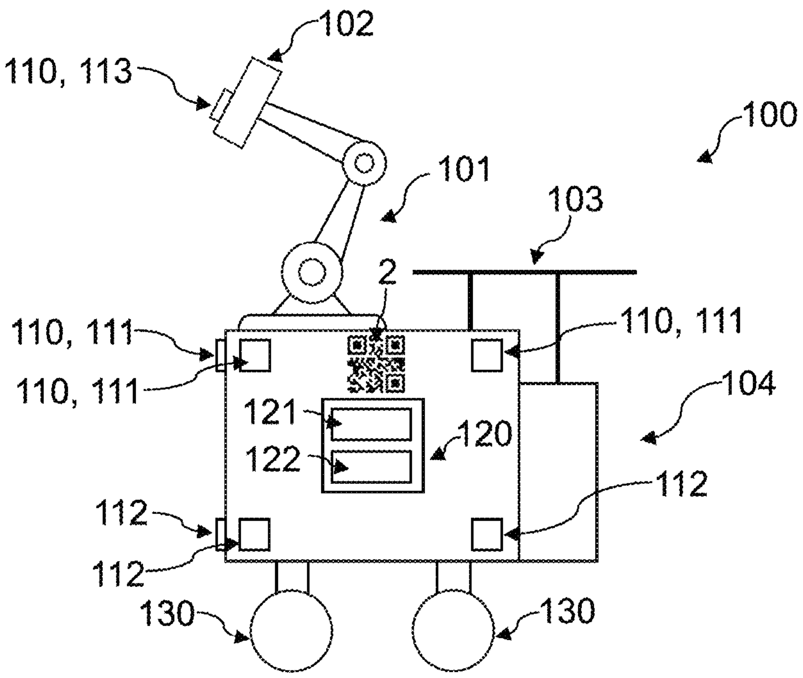
FIG. 1 is a schematic view of an autonomous mobile robot that utilizes/implements the navigation system/method of the present disclosure.

FIG. 1 shows an autonomous mobile robot 100. The autonomous mobile robot 100 comprises a robot body 104, a robot arm 101 (sometimes also called a manipulator) and an end effector 102 attached to the robot arm 102. Further, a tray 103 (for example for holding different end effectors 102 or as a landing platform for an associated drone 160 (FIGS. 2, 3) is attached to the robot body 104. The autonomous mobile robot 100 further comprises a drive unit (only the wheels 130 shown) to drive the autonomous mobile robot 100 over a ground surface. The autonomous mobile robot 100 also comprises a plurality of optical sensors 110 in the form of near-distance low-resolution cameras 111 as well as a plurality of LiDAR scanners 112. The optical sensors 110 and the LiDAR scanners 112 are arranged around the robot body 104, such that they can view the surroundings of the robot. It should be appreciated that the cameras 111 also can be any other kind of camera, such as high-resolution cameras, variable focus cameras (e.g., utilizing fluid lenses, etc.). The autonomous mobile robot 100 also comprises an additional optical sensor 110 in the form of a high-resolution camera 113 which is part of the end effector 102. It should be appreciated that also more than one high-resolution camera 113 may be provided and that some of the low-resolution cameras 111 may be replaced by high-resolution cameras 113.

The end effector 102 can, for example, be an optical scanner 102 for performing optical inspection scans of a surface (such as a surface of an aircraft or spacecraft fuselage), in order to detect anomalies such as dents, rivet pull-ins, out-of-contour deformations, blend-outs, and scratches. The high-resolution camera 113 is part of this optical scanner 102 in the depicted configuration and may, for example, be a high-resolution matrix scanner. However, the robot body 104 may also directly carry one or more high-resolution cameras 113.

Although shown in simplified form, it should be appreciated that the robot arm 101, in general, may be a robot arm 101 having at least three degrees of freedom (rotations), such that the end effector 102 can be moved to any three-dimensional position and orientation.

A controller 120 is comprised as a resident controller 120 within the autonomous mobile robot 100 in the depicted configuration. The controller 120 comprises a data storage 121 and an optional artificial intelligence module (AI module) 122. The controller 120 may be used to control the general operation of the autonomous mobile robot 100 and may, in particular, be configured to implement the navigation system and method described with regard to the following figures. The optical sensors 110 and the LiDAR scanners 112 are in communication with the controller 120. Although shown as a resident controller 120, at least for the purposes of the navigation system 10 (FIG. 2) and method described herein, the controller 120 may also be a remote controller, that is arranged elsewhere outside of the autonomous mobile robot 100 but is in communication with the robot, in particular with the optical sensor 110. FIG. 1 also shows an exemplary QR code 2 as one of the optical identifiers 2 as part of the navigation system 10 described with regard to FIG. 2. This exemplary QR code 2 is attached to the robot body 104 of the autonomous mobile robot 100 and may be used for providing the current location of the autonomous mobile robot 100 (for example, determined by the navigation system 10 of FIG. 2 and communicated via a data connection) to other devices, such as to other autonomous mobile robots 100 or to the handheld device 170 described with regard to FIG. 4. These other devices may then also use the location of the autonomous mobile robot 100 when implementing the navigation system 10 of FIG. 2.

Figure 2:
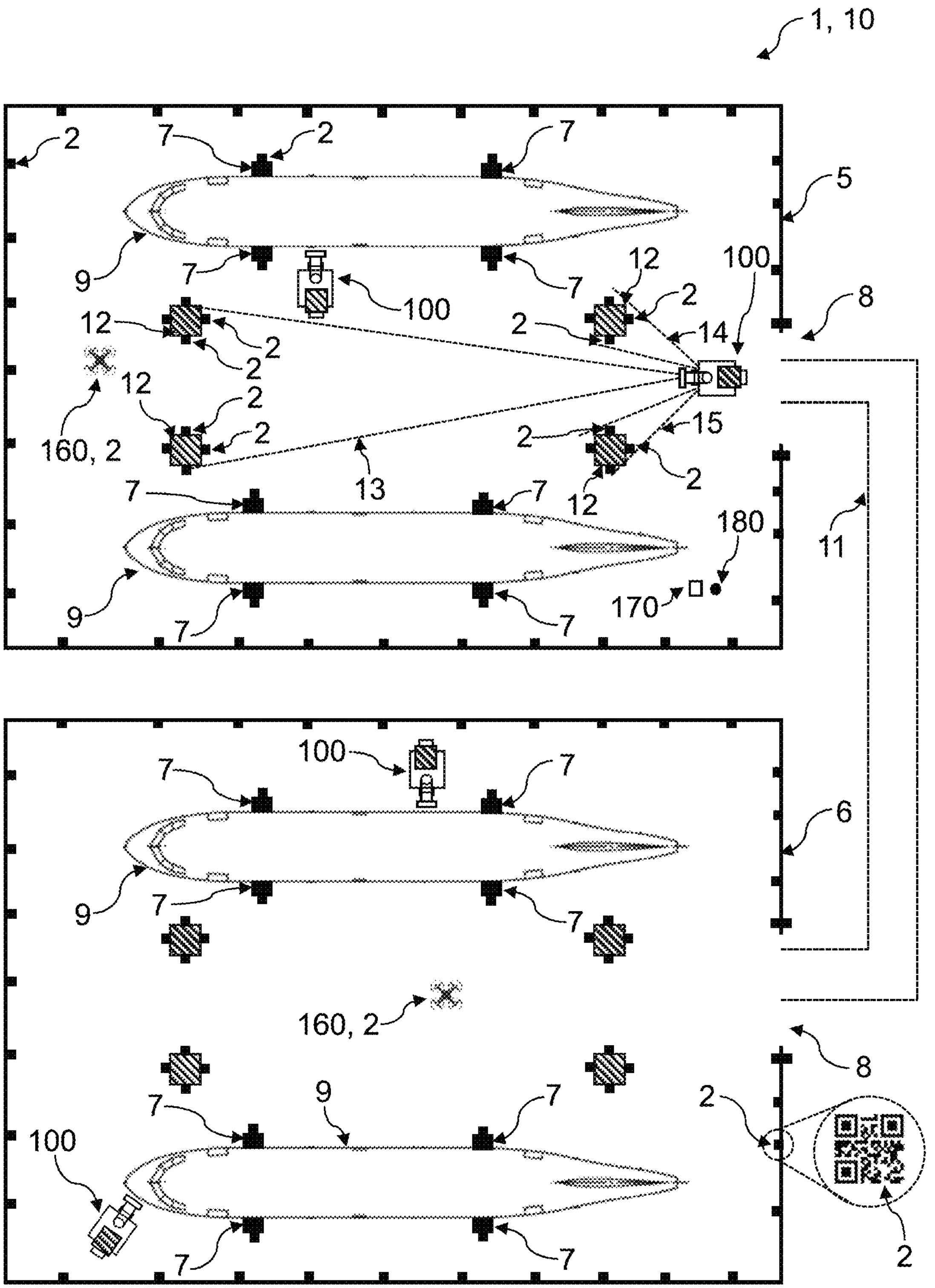
FIG. 2 is a schematic top view of an environment, in which a navigation system/method according to the present disclosure is used in an exemplary scenario.
Figure 3:
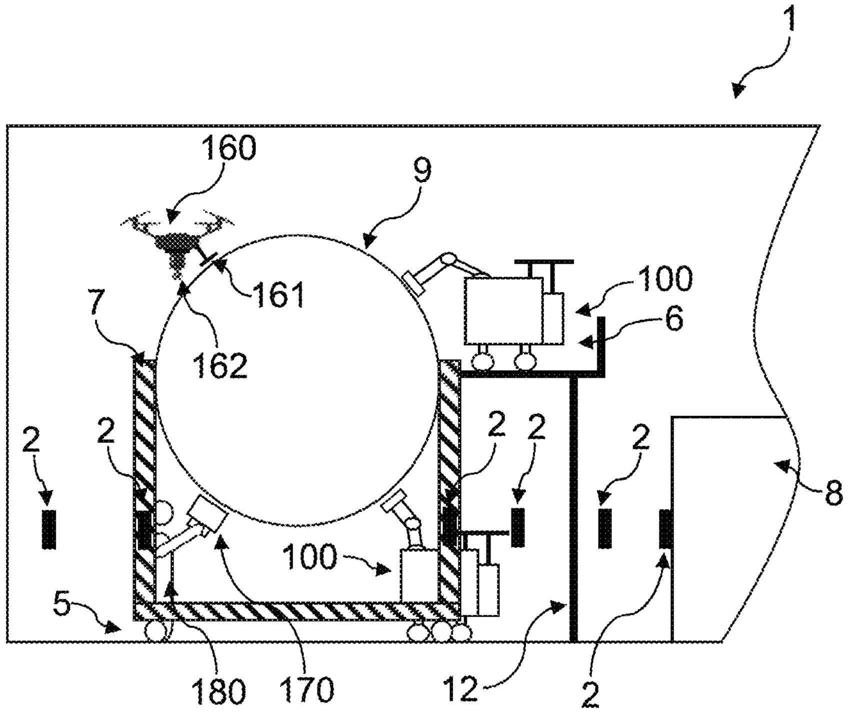
FIG. 3 is a schematic cut view of an environment, in which a navigation system/method according to the present disclosure is used in a further exemplary scenario.

FIG. 2 illustrates the navigation system 10 implemented by the autonomous mobile robot 100 exemplary with an environment 1 consisting of two regions 5, 6 in the form of assembly hangars (highly schematic), which are connected by an outdoor path 11. The assembly hangars 5, 6 are shown in a schematic top view. The navigation system 10 will, in particular, be described with regard to the first region 5 (upper part of FIG. 1). Within each of the regions 5, 6, two aircraft fuselages 9, or rather body sections of such fuselages 9, are shown. Each of the fuselages 9 is supported by a supporting structure 7. Within each of the regions 5, 6, four vertical support beams 12 are present, which, for example, may support an upper platform at the corresponding assembly station, as shown in FIG. 3. In each of the two regions 5, 6, two autonomous mobile robots 100 are currently present, each of which may be configured as described with regard to FIG. 1. As depicted, the autonomous mobile robots 100 are inspection robots for performing surface inspections of the fuselages 9. However, the autonomous mobile robots may also be any other kind of autonomous mobile robot 100 (for example, autonomous riveting robots). The autonomous mobile robots 100 may automatically navigate within the environment 1. As part of the navigation system 10, which is implemented mostly by the autonomous mobile robots 100, within each of the regions 5, 6 of the environment 1, a plurality of optical identifiers 2 (for the sake of clarity of the illustration, not all of which are indicated by reference signs), e.g., in the form of QR codes or any other form described herein further above, are present. The optical identifiers 2 are depicted in a highly schematic representation as small squares. It should be appreciated that the optical identifiers 2 are arranged such that, in general, they can become visible by the optical sensors (cameras) 110 of the autonomous mobile robots 100 if they are positioned accordingly. The optical identifiers 2 may be arranged in different heights or all in the same height. In the depicted example, at each of the vertical support beams 12, four optical identifiers 2 are arranged. Further, at each vertical beam of the supporting structures 7 supporting the fuselages 9, one optical identifier 2 is arranged, and a plurality of further optical identifiers 2 are arranged on the walls of the assembly hangars/regions 5, 6. The assembly hangars 5, 6 can be entered via corresponding doors 8. At each of the doors 8, also on the outside optical identifiers 2 are arranged for facilitating outdoor to indoor transfer of the autonomous mobile robots 100.

The optical identifiers 2 each encode a location within the environment 1, at which the corresponding optical identifier 2 is arranged. For example, each optical identifier 2 may be in the form of a QR code that encodes a data content that contains the coordinates at which the corresponding QR code is arranged. The optical identifiers 2 may be printed, attached (e.g., printed on a sticker that is attached at the corresponding location), light projected, or otherwise arranged at the corresponding locations. Preferably, the optical identifiers 2 all have the same size.

FIG. 2 shows a situation, in which one of the autonomous mobile robots 100 just has entered region 5 through the corresponding door 8 and navigates within the region 5 of the environment 1 utilizing the navigation system 10. Three fields of view 13, 14, 15 of three forward facing cameras/optical sensors 110 are indicated by dashed lines. The first field of view 13 corresponds to a high-resolution camera 113 (see FIG. 1). The second field of view 14 and the third field of view 15 correspond to near-distance low-resolution cameras 111. Within the first field of view 13, six optical identifiers 2 (two on each of the corresponding vertical support beam 12 within the field of view and two on the wall in front of the autonomous mobile robot 100) are currently visible. Further, within each of the second field of view 14 and third field of view 15, two optical identifiers 2 are visible (on the corresponding vertical support beams 12). Therefore, in total, ten optical identifiers 2 are currently visible which may be used by the controller 120 to determine a current localization and orientation of the autonomous control robot 100. The controller decodes the visible optical identifiers 2 and hence obtains their locations within the environment 1. Further, from the apparent sizes of the currently visible optical identifiers within the recorded pictures, the controller 120 determines a distance to each of the visible optical identifiers 2.

Using the determined locations of the visible optical identifiers 2 and the determined distances to each of the visible optical identifiers (under consideration of the viewing directions, which are known because the arrangement of the optical sensors (cameras) 110 on the autonomous mobile robot 100 is known to the controller 120), the controller 120 determines a current localization of the autonomous mobile robot 100, for example using a triangulation method with each pair of the visible optical identifiers 2, as described herein further above.

Optionally, in the triangulation method a weight is assigned to each of the visible optical identifiers 2, which is used in the triangulation as well as in determining the final localization. In particular, the controller 120 may assign a higher weight to optical identifiers 2 closer to the autonomous mobile robot 100 because these optical identifiers yield a more accurate localization result. For example, the triangulation with each pair of the visible optical identifiers 2 yields a position of the autonomous mobile robot 100. Depending on the assigned weights to the optical identifiers, the controller 120 may, for example, determine a final localization as a weighted average of the individual localizations.

The localizations are continuously determined in this way while the autonomous mobile robot 100 moves through the environment 1. Hence, the controller 120 continuously obtains pictures of the environment 1 using the optical sensors 110, detects visible optical identifiers 2 within the pictures, which are within a combined field of view of all the optical sensors 110, decodes the data content of the detected visible optical identifiers 2, determines real-time localizations of the autonomous mobile robot within the environment 1, and navigates the autonomous mobile robot 100 based on the real-time localizations.

Optionally, a redundancy check may be performed using the LiDAR scanners 112 or another navigation method. For example, in FIG. 2, the autonomous mobile robot 100 may use LiDAR scanners 112 arranged on the side of the autonomous mobile robot 100 to determine a distance to the corresponding opposite wall. This position determined by means of the LiDAR scanners 112 is compared to the localization obtained by the optical navigation (navigation by means of the optical identifiers 2) and a variance between the two localization methods is estimated. If this variance is below a first threshold, the navigation occurs purely on the optical navigation. If the variance is above a second threshold (which may also be the same as the first threshold), the autonomous mobile robot 100 is stopped and a human operator 180 may be notified to take care of the situation.

In FIG. 2, further in each of the regions (assembly hangars) 5, 6, a drone 160 is present. The drone 160 may navigate in the same way as the autonomous mobile robot 100. In particular, the term "autonomous mobile robot" as used herein, although described for ground-based vehicles, also covers other vehicles such as the drone 160. The drone 160 as well as other autonomous mobile robots 100 and handheld devices 170 (one shown in FIG. 2) may also assist in navigating the subject autonomous mobile robot 100. Optical identifiers 2 may also be attached to each moving object (drone 160 (only indicated by reference sign 2, not explicitly shown), autonomous mobile robots 100, handheld device 170, etc.) or to the fuselages 9 itself. The moving objects 100, 170, 160 may each continuously determine their current location and may assist each other in determining real-time localizations by continuously transmitting their locations via a network connection to the other moving objects 100, 160. In this way, each moving object 100, 170, 160 may serve as a reference location, just as the fixed optical identifiers 2.

Optionally, the autonomous mobile robot 100 may move faster, if more of the optical identifiers 2 are currently visible because in such a case, accuracy of the localization can be increased.

Further, the navigation system 10 may enable navigating between regions 5, 6 in that automatically a corresponding map of the new region is loaded once the autonomous mobile robot 100 enters the new region. For example, if the autonomous mobile robot 100 leaves the region 5 in FIG. 2 via door 8, a map of the outdoor region, in particular containing the path 11, can be loaded. The autonomous mobile robot 100 or rather the controller 120 may detect such a change of regions by means of the detection of corresponding optical identifiers 2, for example, if an optical identifier 2 is decoded for the first time that belongs to the new region or if a dedicated optical identifier 2 is decoded, that contains a hint at the region change. For example, the optical identifiers 2 on the side of the door 8 may contain instructions to switch to a map of the region behind the door 8, once they are passed by the autonomous mobile robot 100. Therefore, for example, once the autonomous mobile robot 100 leaves one of the regions 5, 6, the controller may first load a map of the outdoor region (path 11) and may then load a map of the other one of the regions 5, 6 when entering the corresponding door 8. In FIG. 2, also one of the optical identifiers 2 (in region 6) is exemplary shown in enlarged form as a QR code 2.

FIG. 3 shows a cut view of a part of one of the assembly hangars of FIG. 2. In FIG. 3, a scenario is illustrated in which an autonomous mobile robot 100 works on different levels (i.e., vertically separated areas 5, 6) as the regions of the environment 1. It is illustrated that one autonomous mobile robot 100 works on a top level 6 while another one works on a base level 5 of the corresponding environment 1. Each of the autonomous mobile robots 100 may switch between these levels 5, 6, i.e., change regions of the environment having distinct maps. For example, the autonomous mobile robot 100 may switch levels by means of an elevator (not shown). The transfer between the corresponding level 5, 6 to the other level 5, 6 may then be done in the same way as the switch between regions described above with regard to FIG. 2. However, here the elevator corresponds to the transition point. In other words, once the autonomous mobile robot 100 enters the elevator (the autonomous mobile robot 100 may navigate to the elevator in the described way using the optical navigation) it may detect this by decoding a corresponding optical identifier 2, e.g., arranged on the side of an elevator door. It may then enter the elevator, for example using the LiDAR scanners 112, and may switch the map to the map of the new level 5, 6. FIG. 3 also shows a handheld device 170 that is used by a human operator 180 to work on a surface of the fuselage 9, as described further below with regard to FIG. 4.

Figure 4:
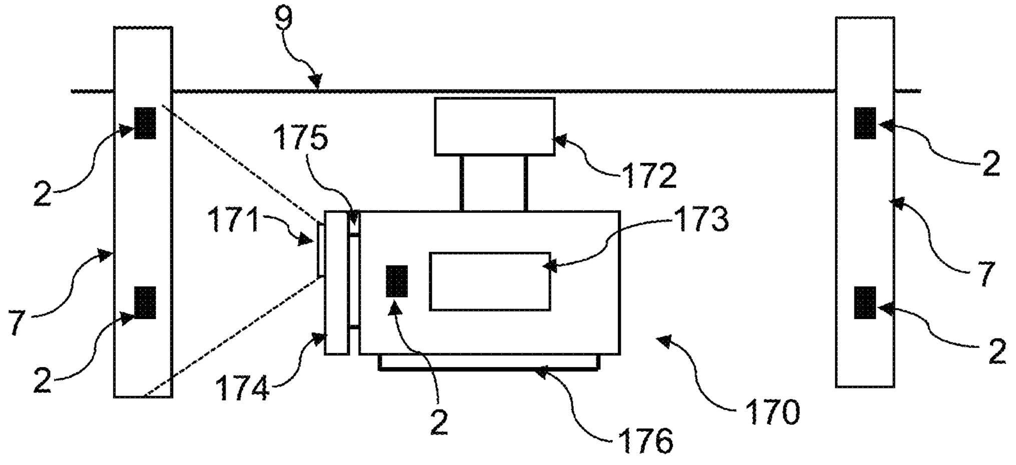
FIG. 4 is a schematic view of a handheld device using the localization method of the navigation system described herein for correlating data pertaining to a work task with corresponding work positions.

FIG. 4 shows a handheld device 170 for performing a work task on an object 9, such as a fuselage 9. For example, the handheld device 170 may be a manual inspection scanner having an optical scanner 172 (similar to the optical scanner 102 of the autonomous mobile robot 100) that is used to manually scan the surface of an aircraft fuselage 9 for anomalies. The handheld device 170 as depicted comprises a work tool 172, here in the form of an optical scanner 172. However, the work tool 172 may also be any other work tool 172, such as a riveting tool, etc. The handheld device 170 further comprises a controller 173, a camera 171, and a handle 176 for holding the handheld device 170. Here, the camera 171 is a camera of a smartphone 174 that is attached to the handheld device 170 via an adapter 175.

Oftentimes, it is necessary to save position, for example, on the fuselage 9, at which a corresponding scan (or in general work task) has been performed (for example a position of a stringer or a frame (or both) of the fuselage 9, at which the scan has been taken. In order to avoid manually entering or marking the position on the object/fuselage 9, the handheld device 170 uses the same principle as the navigation system 10 described above, to obtain its current location. Therefore, the corresponding discussion for how the real-time localizations are obtained by detecting visible optical identifiers 2 within the environment 1 will not be repeated. Any and all features described with regard to the real-time localizations of the autonomous mobile robot 100 using the navigation system 10 are fully valid for the handheld device 170.

However, instead of for navigation purposes, the real-time localizations may be obtained, for example, each time a scan (or some other work task) is performed. The determined localization at each work task (i.e., the position, at which the handheld device is located within the environment 1) are used to determine a position on the object 9 (e.g., a position on a fuselage 9), at which the work task (here the optical scan) has been performed. These positions may then be correlated with data pertaining to the work task (e.g., with optical scans taken at that position).

The camera 171 of the handheld device 170, that is used for obtaining pictures of the environment 1 may either be an integrated camera 171 of the handheld device 170, or (as depicted) may be a camera 171, that can be attached to the handheld device 170 and that communicates with the controller 173 and can be used by the controller 173 for obtaining the pictures of the optical identifiers 2 within the environment 1. For example, as depicted, the camera 171 may be a camera 171 of a smartphone 174, that is attached to the handheld device 170 at a corresponding adapter 175. The smartphone 174 may then be connected to the controller 173 and may be used for obtaining the corresponding pictures.

The process of obtaining the localizations has been described with regard to the navigation system 10 (FIG. 2, 3) and will not be repeated here. As depicted, in the situation in FIG. 4, the camera 171 captures two optical identifiers 2, such as QR codes 2, that are arranged on a supporting structure 7 for the fuselage 9. However, this is only one exemplary situation. Depending on the scan position, the camera may capture other optical identifiers 2 as well as more or less optical identifiers 2. The mechanism is exactly the same as described with regard to the localization of the autonomous mobile robot 100 by means of the navigation system 10 (FIGS. 2, 3).

Further, the handheld device 170 may also itself carry at least one optical identifier 2, which can be used by the navigation system 10 described herein, for example with regard to FIGS. 2 and 3, if the handheld device 170 is present within the environment 1. The handheld device 170 may, in particular, also send its current location to devices such as drones 160 and autonomous mobile robots 100 that are navigating via the navigating system 10, such that the handheld device 170 can be used as an additional position reference, just as the optical identifiers 2 located at fixed locations within the environment 1, as described with regard to FIGS. 2 and 3 further above.

Figure 5:
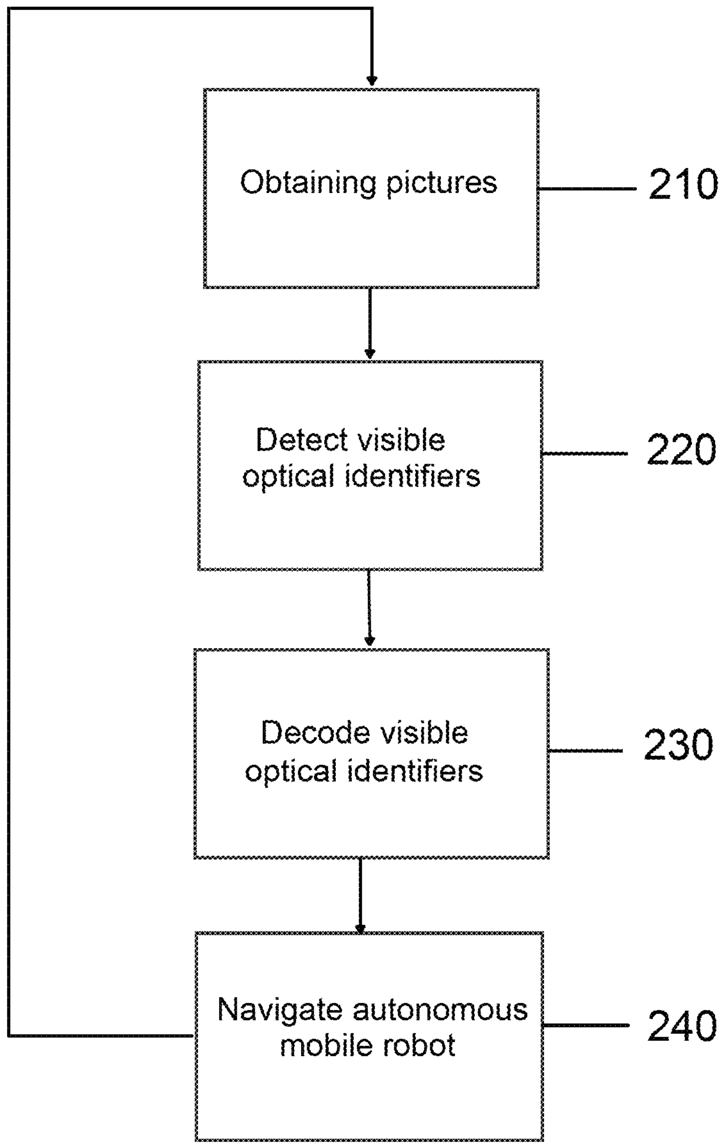
FIG. 5 is a flow chart of a method for navigating an autonomous mobile robot within an environment, which can, for example, be implemented with the navigation system of FIGS. 2 and 3.

FIG. 5, with continued reference to FIGS. 1 to 3, shows a flow chart of a method 200 for navigating an autonomous mobile robot 100 within an environment 1. The method 200 may, for example, be performed by the navigation system 10 of FIGS. 2, 3 with the autonomous mobile robot 100 of FIG. 1. The steps of the method 200 have been concurrently described with regard to the discussion of the navigation system 10. Therefore, for the sake of brevity, the steps of the method 200 will only be described very shortly.

The method 200 starts in step 210 with obtaining pictures of the environment 1. The pictures may be obtained by the controller 120 via the optical sensors 110 of the autonomous mobile robot 100.

In step 220, the controller 120 detects visible optical identifiers 2 of a plurality of optical identifiers 2 (such as QR codes 2). The visible optical identifiers 2 are optical identifiers 2 which are currently within a combined field of view of the optical sensors 110, as described above with regard to the navigation system 10. Each of the optical identifiers 2 encodes a fixed location within the environment 1 at which it is arranged.

In step 230, the controller 120 decodes the visible optical identifiers 2 and determines a current localization of the autonomous mobile robot 100 within the environment 1 based on the decoded optical identifiers 2. Determining the localization may be done by a weighted triangulation method with each pair of visible optical identifiers 2, as described above.

Steps 210, 220, and 230 are performed continuously while the autonomous mobile robot 100 moves through the environment 1. In other words, the autonomous mobile robot 100 determines, in real-time, its localization within the environment 1 by monitoring the environment 1 for optical identifiers while it moves.

In step 240, the controller 120 navigates the autonomous mobile robot 100 based on the real-time localizations. Step 240 may be running concurrently with the continuous localization of the autonomous mobile robot 100 within the environment.

The systems and devices described herein may include a controller, such as controller 120, control unit, control device, controlling means, system control, processor, computing unit or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, such as AI module 122, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

It should be noted that "comprising" or "including" does not exclude other elements or steps, and "one" or "a" does not exclude a plurality. It should further be noted that features or steps that have been described with reference to any of the above embodiments may also be used in combination with other features or steps of other embodiments described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 (production) environment
2 optical identifier
3 first subset of optical identifiers
4 second subset of optical identifiers
5 first region of the environment (assembly hangar; base level)
6 second region of the environment (assembly hangar; top level)
7 supporting structure
8 door
9 fuselage
10 navigation system

11 outdoor path
12 vertical support beams
13 first field of view
14 second field of view
15 third field of view
100 autonomous mobile robot
101 robot arm/manipulator
102 end effector, optical scanner
103 tray
104 robot body
110 optical sensor
111 near-distance low-resolution camera
112 LiDAR scanner
113 high-resolution camera
120 controller
121 data storage
122 artificial intelligence module (AI module)
130 wheels
160 drone
161 optical scanner of drone
162 camera of drone
170 handheld device
171 camera (of handheld device)
172 work tool, optical scanner (of handheld device)
173 controller
174 smartphone
175 adapter
176 handle
180 human operator
200 method
210 obtaining pictures
220 detecting optical identifiers
230 decoding optical identifiers
240 navigating based on optical identifiers

The invention claimed is:

1. A navigation system for navigating an autonomous mobile robot within an environment, the navigation system comprising:

at least one optical sensor attached to the autonomous mobile robot;

a controller in communication with the at least one optical sensor; and a plurality of optical identifiers distributed within the environment at fixed locations and detectable by the at least one optical sensor;

wherein each of the plurality of optical identifiers encodes a location within the environment;

wherein the controller is configured to:

obtain pictures of the environment via the at least one optical sensor;

detect visible optical identifiers of the plurality of optical identifiers, which are within a field of view of the at least one optical sensor;

decode the visible optical identifiers;

navigate the autonomous mobile robot based on real-time localizations of the autonomous mobile robot within the environment using the decoded visible optical identifiers;

estimate a distance to each of the visible optical identifiers and to navigate the autonomous mobile robot by applying a triangulation method using each pair of the visible optical identifiers; and, assign a weight to each of the visible optical identifiers based on the distance, wherein optical identifiers closer to the autonomous mobile robot are assigned a higher weight for navigating the autonomous mobile robot.

2. The navigation system of claim 1, wherein the controller is configured to store a navigation history of the autonomous mobile robot; and wherein the navigation history is used as training data for an artificial intelligence module.

3. The navigation system of claim 2, wherein the artificial intelligence module is used to optimize paths of the autonomous mobile robot, to identify anomalies within the environment, or both optimize and to identify.

4. The navigation system of claim 1, wherein the at least one optical sensor comprises at least one of a high-resolution camera and a near-distance low-resolution camera.

5. The navigation system of claim 1, wherein each of the plurality of optical identifiers is a printed or light projected optical identifier and comprises at least one of the following:

a QR code;

a barcode;

a JAB code;

an Aztec code; and a reference number.

6. The navigation system of claim 1, wherein the plurality of optical identifiers comprises a first subset of optical identifiers and a second subset of optical identifiers;

wherein the first subset is associated with a first region of the environment; and wherein the second subset is associated with a second region of the environment.

7. The navigation system of claim 1, wherein the localizations using the decoded visible optical identifiers are determined by referencing a map of the environment stored in a data storage based on the visible optical identifiers.

8. The navigation system of claim 1, further comprising at least one LiDAR scanner arranged at the autonomous mobile robot and in communication with the controller;

wherein the at least one LiDAR scanner is configured to scan a surrounding environment of the autonomous mobile robot;

wherein the controller is configured to additionally localize the autonomous mobile robot within the environment based on the scan of the at least one LiDAR scanner; and wherein the controller is configured to compare the localization of the at least one LiDAR scanner with the localization of the at least one optical sensor and to obtain a corresponding variance.

9. The navigation system of claim 8, wherein the controller is configured to:

when the variance is below a first threshold, navigate the autonomous mobile robot purely based on the plurality of optical identifiers; and when the variance is higher than a second threshold, stop the autonomous mobile robot.

10. The navigation system of claim 1, wherein each of the plurality of optical identifiers is arranged at one of the following:

a wall within the environment;

a supporting structure for a product to be processed by the autonomous mobile robot;

the product to be processed by the autonomous mobile robot;

a second autonomous mobile robot or another robot system in communication with the controller;

a drone;

a handheld device; or a human operator.

11. A navigation system for navigating an autonomous mobile robot within an environment, the navigation system comprising:

at least one optical sensor attached to the autonomous mobile robot;

a controller in communication with the at least one optical sensor; and a plurality of optical identifiers distributed within the environment at fixed locations and detectable by the at least one optical sensor;

wherein each of the plurality of optical identifiers encodes a location within the environment;

wherein the controller is configured to:

obtain pictures of the environment via the at least one optical sensor;

detect visible optical identifiers of the plurality of optical identifiers, which are within a field of view of the at least one optical sensor;

decode the visible optical identifiers;

navigate the autonomous mobile robot based on real-time localizations of the autonomous mobile robot within the environment using the decoded visible optical identifiers, wherein the plurality of optical identifiers comprises a first subset of optical identifiers and a second subset of optical identifiers;

wherein the first subset is associated with a first region of the environment; and wherein the second subset is associated with a second region of the environment.

12. A navigation system for navigating an autonomous mobile robot within an environment, the navigation system comprising:

at least one optical sensor attached to the autonomous mobile robot;

a controller in communication with the at least one optical sensor;

a plurality of optical identifiers distributed within the environment at fixed locations and detectable by the at least one optical sensor; and, at least one LiDAR scanner arranged at the autonomous mobile robot and in communication with the controller, wherein the at least one LiDAR scanner is configured to scan a surrounding environment of the autonomous mobile robot;

wherein each of the plurality of optical identifiers encodes a location within the environment;

wherein the controller is configured to:

obtain pictures of the environment via the at least one optical sensor;

detect visible optical identifiers of the plurality of optical identifiers, which are within a field of view of the at least one optical sensor;

decode the visible optical identifiers;

localize the autonomous mobile robot within the environment based on the scan of the at least one LiDAR scanner;

compare the localization of the at least one LiDAR scanner with the localization of the at least one optical sensor and to obtain a corresponding variance;

navigate the autonomous mobile robot based on real-time localizations of the autonomous mobile robot within the environment using the decoded visible optical identifiers, wherein when the variance is below a first threshold, navigate the autonomous mobile robot purely based on the plurality of optical identifiers and when the variance is higher than a second threshold, stop the autonomous mobile robot.

* * * * *